S. ROESNER.
SHUTTER OPERATING APPARATUS FOR PHOTOGRAPHIC LENSES.
APPLICATION FILED MAR. 31, 1910.
969,194.
Patented Sept. 6, 1910.
2 SHEETS—SHEET 2.
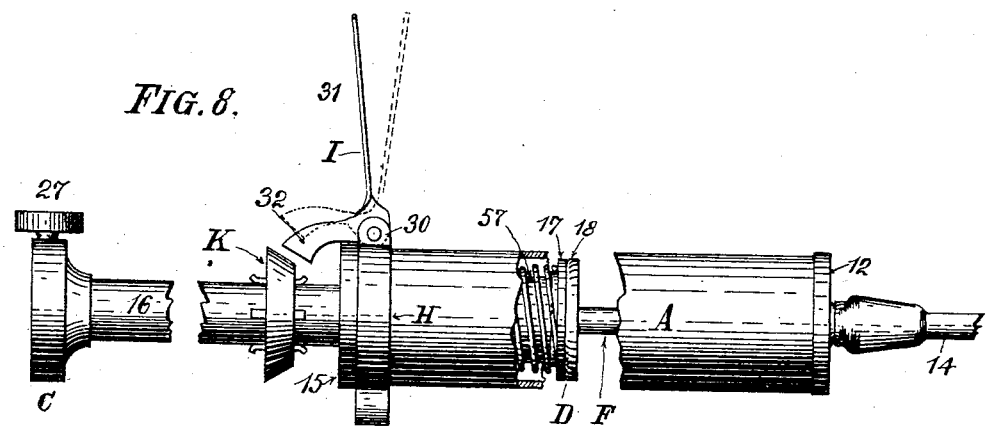
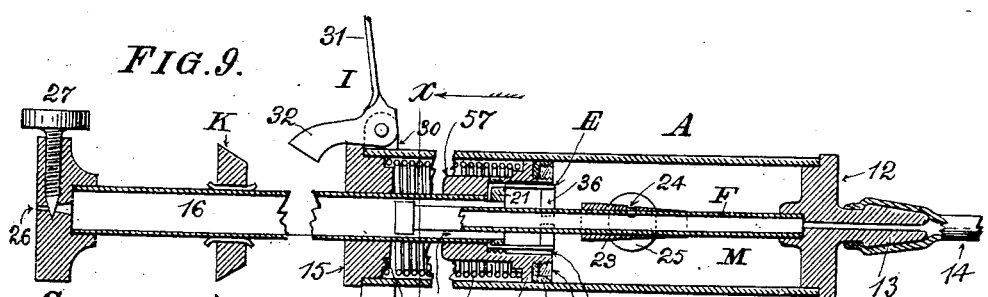
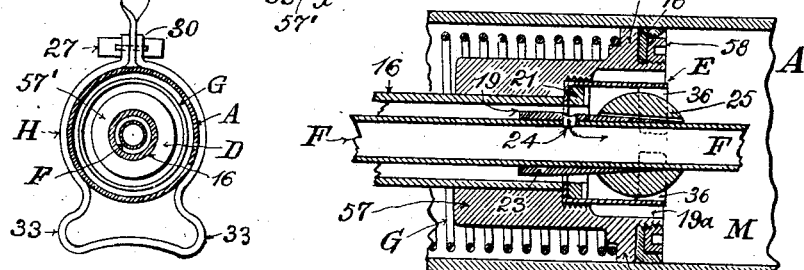
Witnesses:
C. B. Knudsen
A. G. Peterson
Inventor:
Siegmund Roesner,
By Michael J. Stark & Sons,
Attorneys.

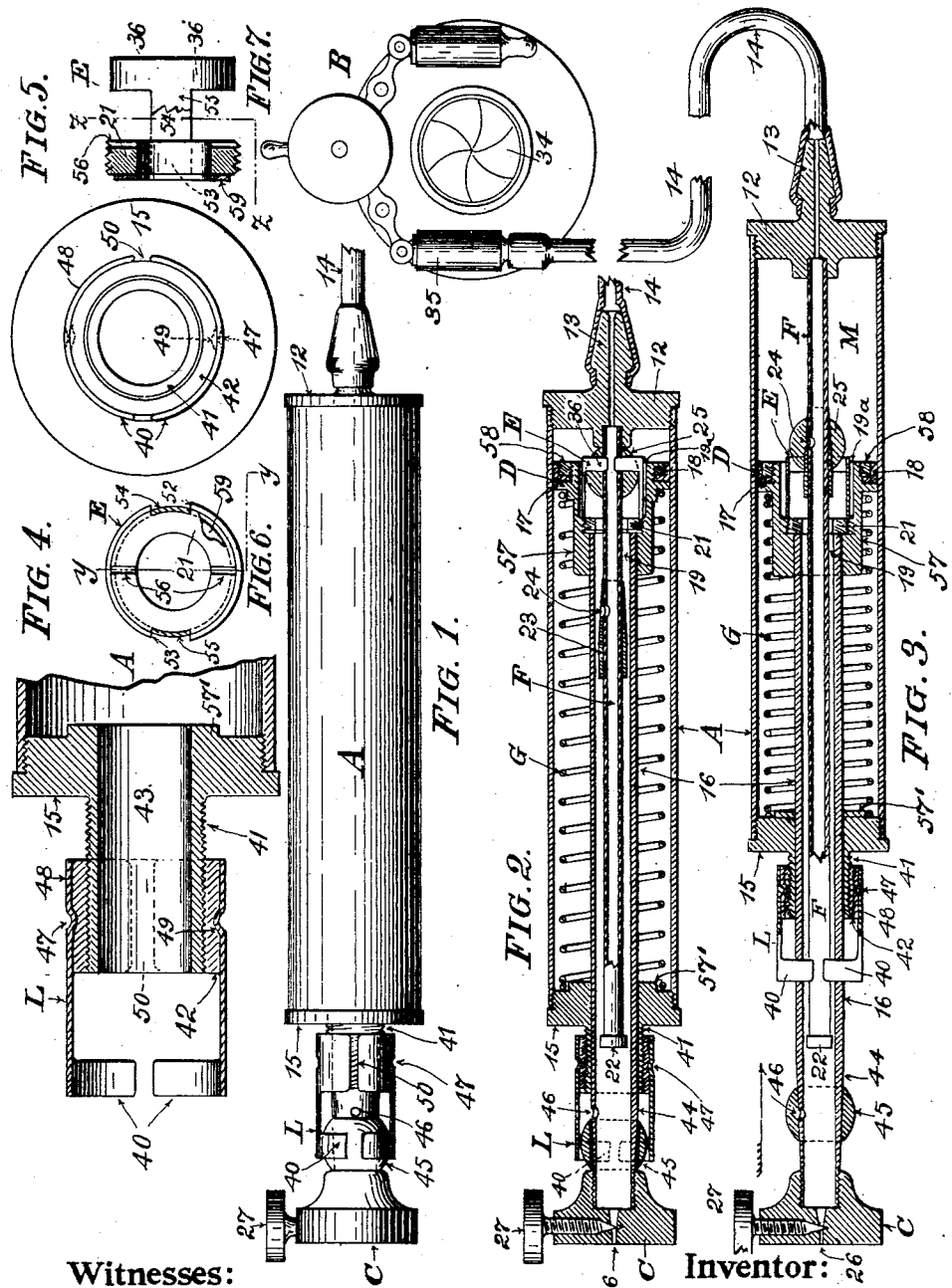

UNITED STATES PATENT OFFICE.

SIEGMUND ROESNER, OF CHICAGO, ILLINOIS.

SHUTTER-OPERATING APPARATUS FOR PHOTOGRAPHIC LENSES.

969,194. Specification of Letters Patent. Patented Sept. 6, 1910.

Application filed March 31, 1910. Serial No. 552,568.

*To all whom it may concern:*

Be it known that I, SIEGMUND ROESNER, an alien who has declared his intention to become a citizen of the United States, and resident of Chicago, Cook county, Illinois, have invented certain new and useful Improvements in Shutter-Operating Apparatus for Photographic Lenses; and I do hereby declare that the following description of my said invention, taken in connection with the accompanying sheets of drawings, forms a full, clear, and exact specification, which will enable others skilled in the art to which it appertains to make and use the same.

This invention has general reference to automatic means for operating the shutters of photographic lenses; and it consists, essentially, in the novel and peculiar combination of parts and details of construction as hereinafter first fully set forth and described, and then pointed out in the claims.

The object of this invention is the production of an efficient, serviceable, and comparatively inexpensive device for operating the shutter of a photographic lens to actuate the same in place of the usual pneumatic bulb, and to permit of the elapsing of a predetermined period of time between the setting of my device and the actuating of the shutter.

It has also for its object the introduction, in a device as set forth, of visual means adapted to signal approximately at the time when this device actuates the said shutter-operating means.

In taking photographic views, groups, or single persons, it is frequently desired that the photographer, or the person operating the photographic camera and making the exposure of the light-sensitive plate or film, appear in the resultant picture, and that, to enable him or her to assume the desired position or posture, after the camera has been prepared for the taking of said exposure, a sufficient interval of time elapse for the operator to assume such position. It is, furthermore desirable that such a shutter-operating device be adjustable as to the period of time that shall intervene between the setting of the shutter-operating mechanism and the making of the actual exposure, and that the entire apparatus be positive in its action and comparatively inexpensive in cost. To accomplish these objects, I construct this pneumatic shutter-operating mechanism, substantially as illustrated in the accompanying drawings, in which—

Figure 1 is a side view of the said device. Fig. 2 is a longitudinal sectional view of the same. Fig. 3 is a similar view of the same showing the position of the parts just prior to the initial step in the operation of this device, or the releasing of the shutter of a photographic lens. Fig. 4 is an enlarged sectional view of a portion of this apparatus, illustrating particularly the clutch mechanism at the end of the cylinder. Fig. 5 is an end view of the same. Fig. 6 is an end view, partly in section of the clutch located in the piston, the section being on line $z\ z$ of Fig. 7. Fig. 7 is a side view of the same, partly in section, on line $y\ y$ of Fig. 6. Fig. 8 is a side view of the complete apparatus, parts being broken, and illustrating interior construction. Fig. 9 is a longitudinal sectional elevation of the same. Fig. 10 is a transverse sectional elevation on line $x\ x$ of Fig. 9, and Fig. 11 is a longitudinal sectional view on an enlarged scale, of the central portion of this device and showing the position of the piston at the moment that the shutter operating device on the lens has received its first impulse.

Like parts are designated by corresponding characters and symbols of reference in all the figures.

This present device comprises a cylinder A, of convenient diameter and suitable length. This cylinder has at one end a head 12, preferably in screw-threaded connection with the cylinder A, and provided with a hose-nipple 13, to which a rubber tube 14, is attached, that connects this cylinder with the shutter-operating means 35, on a photographic lens B, in the usual manner. The opposite end of the cylinder A is also provided with a head 15, which head is centrally apertured at 43, for the passage of a tubular piston rod 16, which rod has at its outer end a collar C, to which I shall hereinafter more fully refer.

The inner end of the tubular piston rod 16 carries a piston D, comprising a follower 17, formed integral with a central boss 57, in which the tubular piston rod 16 is secured, and a preferably leather cup 18, held to the piston D by a screw-collar 58. In this piston there is a bore 19, having an enlargement 19ª, wherein is located a clutch E, shown in detail in Figs. 6 and 7, said clutch being a spring-steel structure comprising a circular plate 59, having on diametrically opposite points bars 54, 55, and at the ends of said bars semicircular jaws 36, said clutch E being retained in the piston D by an exteriorly-screw threaded collar 21, having in its periphery notches 52, 53, engaging the bars 54, 55, said collar 21 engaging an internally screw threaded portion of the enlarged bore 19$^a$, in said piston D, as clearly shown in Fig. 11 on an enlarged scale.

To the forward cylinder head 12, and in axial line with the axial line of the cylinder A, there is secured a tube F, which enters the tubular piston rod 16, and which has on its inner end a cap 22, adapted to close the end of said tube, and to guide the same in the tubular piston rod 16. At a suitable distance from the cylinder head 12, the tube F has a fixed sleeve 23, which is tapered toward the cylinder head 12, and in which, and the tube F there is an opening 24, adapted to establish communication between the interior M of the cylinder A, and the interior of the tube 14, through the tube F. Upon this tube F, between the sleeve 23 and the cylinder head 12, there is located a laterally movable valve 25, which is preferably ball-shaped in contour. This valve is bored tapering to correspond with the taper of the sleeve 23, whereby it is permitted to move between the sleeve 23 and the cylinder head 12, but prevented from moving beyond said tapering sleeve, its normal position being shown in Fig. 3.

Between the piston D and the cylinder head 15 there is located upon the piston rod 16, and bearing with one end upon the shoulder 57′ on the cylinder head 15, a spiral spring G, the function of which is to force the piston toward the cylinder head 12 to compress air in the chamber M.

The collar C at the end of the piston rod 16 has centrally a minute orifice 26, the area of which is controlled by a needle-pointed set screw 27, which orifice communicates with the chamber M through the tubular piston rod 16 and the passage 19, 19$^a$, in the piston D.

Near the cylinder head 15, the cylinder A is surrounded by a clamp H, the ends of which form pivotal lugs 30, wherein is pivoted a bell-crank I, one member 31 of which serves as a target and the other member, 32, acting as a lever to operate in conjunction with a slidable friction stop K, located upon the piston rod 16 to throw the target when the tapering periphery of said stop K reaches the arm 32 and moves the same upwardly. This friction stop K is circular in form so that, no matter what its rotative position may be, it will engage said lever 32 when the piston with its piston rod moves toward the cylinder head 12, and the stop K comes in contact with said lever 32. The clamping member H is formed at its lower portion into a support 33, upon which the cylinder A may rest and whereby it is prevented from rolling upon a table or other object upon which the device may be placed.

The device thus far described is adapted for use in connection with a photographic lens B, the shutter-operating mechanism 35 of which is of the universal type, that is to say, having means for making an instantaneous, or a time-exposure, the latter exposure being automatic as to the interval of time elapsing between the opening and the shutting of the lens, and its operation is substantially as follows: Assume the device is connected with the shutter-operating means 35 of the lens B by the tube 14, and that it is desired that the shutter 34 be actuated to permit of an exposure being automatically made some time after the shutter-operating device has been set, and the piston D is in close proximity to the cylinder head 12, or in the "discharged" position shown in Fig. 2, and the needle-pointed screw 27 adjusted. In this position, the valve 25 is held in the piston by the clutch E. Now the piston rod 16 is pulled as far as the spiral spring G in the cylinder A will permit, the friction collar K moved to its predetermined and known position, and the target I lifted. This movement of the piston has brought the valve 25 upon the sleeve 23 to close the exit opening 24, and the valve slipped out of the clutch E, as it were, after it has seated upon the tapering sleeve. Release the piston rod and the spiral spring G will force the piston D in the direction of its first-mentioned position, with a speed determined by the size of the orifice 26, as regulated by the needle-pointed screw 27, after it has compressed the air in the chamber M, and escaping through said orifice 26. This part of the movement of the piston D I term the initial step which ends when the clutch E in the piston D reaches the valve 25 and moves it along to uncover the exit opening 24, when the compressed air in the chamber M will rush through the tube F and the rubber tube 14 to the shutter-operating means 35 on the lens B and actuate the shutter, the piston, in the mean time reaching its normal position ready for another setting. It will now be observed that the time required by the piston to travel from its extreme out-position to the point where it uncovers the escape opening 24, may be regulated with considerable precision to occupy a predetermined time, which interval may be from a few seconds to an hour and longer, thereby giving the operator time to assume a position in which he will be included in the resultant picture, and at the same time give a visible signal prior to the exposure being made, so as to be ready for the same.

As heretofore stated, the apparatus described is adapted for use in a photographic lens having a universal shutter, but when this apparatus is to be used in connection with a photographic lens which requires two impulses, viz., one to open the shutter, and the other to close it after a certain length of time, such as are usually given by a rubber bulb by hand, I employ in connection with the apparatus heretofore described, the following means: On the cylinder head 15 I form an outwardly projecting, externally screw-threaded central member 41, as shown in Fig. 4 on an enlarged scale. Upon this member I locate an internally screw-threaded sleeve 42, and upon this sleeve I place a spring-clutch L similar to the clutch E, the jaws 40 of which are adapted to engage a ball-shaped valve 45, Figs. 1, 2, and 3. I also taper the outer end of the tubular piston rod 16 at 44, and locate this ball valve 45 upon this tapering portion 44. In this tapering portion there is an exit opening 46, communicating with the chamber M through the tubular piston rod 26 and the bore in the piston D. And in order that this clutch L may be readily produced from sheet steel from a suitably formed blank there is in its band 48 a slit 50, and in this band there are at diametrically opposite points indentations 47, engaging similar indentations 49, in the periphery of the sleeve 42, said indentations being adapted to retain the clutch L upon said sleeve and permit of the rotation of the latter by turning the clutch L. In operation, this auxiliary attachment to the device already described, acts as follows: When the shutter 34 on the lens B is to be opened and then to remain open for a predetermined interval of time, to make what is usually termed a time exposure, and that, as already described, the piston has moved to the position where it has caused the opening 24 to be uncovered and has sent an impulse to the shutter-operating means 35, air will continue escaping from the orifice 26 until the valve 45 on the tapering portion 44 of the piston rod 16 is reached by the clutch-jaws 40 on the clutch L, when this valve 45 will be unseated as it were, and permit air to escape from the opening 46. This will cause the piston to again move with an accelerated speed and to cause a further compression of air in the chamber M, and to send another impulse to the shutter-operating means 35, and to close the shutter 34. The time intervening between the first and second impulses is regulated by rotating the sleeve 42 with the clutch L upon the externally screw-threaded member 41 on the piston head 15, so that by moving the sleeve 42 away from the cylinder head 15, the interval between the two impulses will be shortened, while a contrary rotation of said sleeve produces the opposite result in a manner readily comprehended.

The apparatus heretofore described is operative without the signaling device and may be operated without the auxiliary valve mechanism at the rear end of the cylinder, but I prefer the construction as shown in Figs. 1 to 7, for the reason that it accomplishes all the results described, except that of giving a visual signal, while the device shown in the remaining figures is adapted for use only in connection with a universal shutter, but, it being constructed of less parts it may be cheaper produced, and it is, therefore, a desirable article of manufacture.

The apparatus heretofore described is comparatively small, the capacity of the chamber M being approximately the same as that of the usual rubber bulb employed on photographic lenses to operate the shutter therein.

I am aware that minor changes in the details of construction may be made by persons skilled in the art to which it appertains without departing from the scope of my invention.

Having thus fully described this invention, I claim as new and desire to secure to me by Letters Patent of the United States—

1. An automatic timer for initiating the operation of the shutter-actuating means of a photographic lens, comprising, in combination, a separate cylinder, a movable piston in said cylinder; an air-escape opening leading from said cylinder to permit air to escape from said cylinder into the atmosphere; a further escape opening leading from said cylinder to said shutter-actuating means, a valve adapted to close the latter opening during the initial movement of said piston; means on said piston adapted to move said valve laterally to open said latter escape opening to cause an escape of air from said cylinder to said shutter-actuating means, as described.

2. An automatic timer for initiating the operation of the shutter-operating means of photographic lenses, comprising in combination, an independent cylinder, a piston in said cylinder, means in said cylinder adapted to move said piston in one direction only, an escape orifice leading from said cylinder into the atmosphere, a further escape opening leading from said cylinder to said shutter-actuating means, a valve adapted to close the latter opening during the first part of the stroke of said piston and to open the same during the remainder of the stroke of said piston.

3. An automatic timer for initiating the operation of the shutter-operating means of a photographic lens, comprising, in combination, an independent cylinder, a piston in said cylinder, a spring in said cylinder adapted to move said piston in one direction, a tubular piston rod to which said piston is attached, there being an escape opening in said piston rod, means whereby the operative area of said escape opening may be regulated, a tube in said cylinder, there being an escape opening in said tube, a valve upon said tube adapted to open and close said latter escape opening, and means in said piston adapted to engage said valve and move the same laterally upon said tube.

4. In a device of the nature described, the combination of a cylinder, a piston in said cylinder, a tubular piston rod to which said cylinder is affixed, a collar at the outer end of said piston rod, there being a discharge orifice in said collar and means adapted to increase and decrease the operative area of said orifice, means adapted to move said piston in one direction only, a cylinder head at one end of said cylinder, a tube in said cylinder head secured thereto, there being a discharge opening in said tube, and a valve on said tube adapted to open and close said discharge opening, there being a clutch in said piston adapted to engage said valve.

5. The combination, of a cylinder, a piston in said cylinder, a clutch in said piston, a tubular piston rod to which said piston is attached, there being a discharge orifice from said tubular piston rod, and means in said discharge opening adapted to regulate the operative area thereof, a spiral spring in said cylinder adapted to move said piston in one direction, a cylinder head at one end of said cylinder, a tube in said cylinder said tube being attached to said cylinder head, there being a discharge opening in said tube, and a valve upon said tube adapted to open and close said discharge opening by a lateral movement upon said tube, a clutch in said piston adapted to embrace said valve, said valve being moved in one direction by said piston, and in the opposite direction by said clutch, said clutch being adapted to release said valve after the latter has closed said discharge opening.

6. In a device for initiating the operation of photographic lens-shutters, the combination, of a cylinder, a piston in said cylinder, a piston rod to which said piston is attached, said piston rod projecting from said cylinder at one end, a spring in said cylinder adapted to move said piston in one direction, a collar on the outside portion of said piston rod, a target pivoted to said cylinder, and an arm on said target adapted to engage said collar to throw said target, said collar being movable upon said piston rod, as described.

7. Means for initiating the operation of the shutter-actuating means of photographic lenses, comprising, in combination, an independent air compressor, comprising a cylinder, a piston in said cylinder, a tubular piston rod to which said piston is attached, said piston rod projecting at one end from said cylinder, there being a discharge-opening in said tubular piston rod at the projecting end, a laterally movable valve upon the projecting end of said piston rod adapted to open and close said discharge-opening, a tube in said cylinder, there being an egress-opening in said tube, a laterally-movable valve upon said tube adapted to open and close said egress-opening, and means for moving said piston, the movement of said piston controlling the lateral movement of said valves.

8. Means for initiating the operation of the shutter-actuating means of photographic lenses, comprising, in combination, a separate cylinder, a movable piston in said cylinder, and two valves, said valves being actuated successively by said piston said piston being adapted to open one of said valves after having moved a predetermined distance to establish communication between said cylinder and the shutter-actuating means, and to open the other valve after having moved a further predetermined distance to establish communication between said cylinder and the outer atmosphere, as described.

9. Means for initiating the operation of the shutter-actuating means of photographic lenses, comprising in combination, a lens, a cylinder, a piston in said cylinder, said piston having an enlarged bore, a clutch located in said enlarged bore, a tube in said cylinder, a tapering sleeve on said tube, a ball-shaped valve on said tube, said valve having a tapering bore corresponding to the taper of said sleeve, an opening in said sleeve and said tube adapted to be closed by said valve, and means for moving said piston, said piston being adapted to move said valve laterally upon said tube when moving in one direction, said clutch being adapted to move said valve laterally upon said tube when the piston is moving in the opposite direction.

10. In a device for initiating the operation of the shutters of photographic lenses, a cylinder, a piston in said cylinder, a piston rod to which said piston is attached, a cylinder head at one end of said cylinder, said piston rod being adapted to pass through said cylinder head and projecting therefrom, a laterally movable valve upon the projecting end of said piston rod, a clutch on the outer end of said cylinder head, and means whereby said clutch may be moved toward and from said cylinder head, said clutch being adapted to engage said valve, as stated.

11. In a device of the nature described, the combination of a cylinder, a piston movably arranged in said cylinder, a tubular piston rod to which said piston is affixed, a collar at the outer end of said piston-rod, there being a discharge orifice in said collar and means adapted to increase and decrease the operative area of said discharge orifice, means adapted to move said piston in one direction only, a cylinder head at one end of said cylinder, a tube in said cylinder and projecting therefrom, there being a discharge opening in said tube and a valve upon said tube adapted to open and close said discharge opening, said valve being operated by said piston.

12. In a device of the nature described, the combination of a cylinder, a piston movably arranged in said cylinder, a tubular piston rod to which said piston is attached, a collar at the outer end of said piston rod, there being in said collar a discharge orifice adapted to increase and decrease the operative area of said discharge orifice; means adapted to move said piston in one direction only, a cylinder head at one end of said cylinder, a tube in said cylinder head and projecting therefrom into said cylinder, there being a discharge opening in said tube, and a valve upon said tube adapted to open and close said discharge opening, said valve being laterally moved upon said tube in one direction by said piston, there being a clutch in said piston adapted to move said valve in the opposite direction.

13. In a device of the nature described, the combination of a cylinder, a piston movably arranged in said cylinder, a tubular piston rod to which said piston is attached, a collar at the outer end of said piston rod, there being a discharge orifice in said collar and means adapted to increase and decrease the operative area of said orifice; means adapted to move said piston in one direction only, a cylinder head at one end of said cylinder, a tube in said cylinder head projecting therefrom into said cylinder, there being a discharge opening in said tube, and a valve upon said tube adapted to open and close said discharge opening, a clutch in said piston, said valve being laterally moved upon said tube in one direction by said piston to open said discharge opening and in the opposite direction by said clutch to close said discharge opening, said clutch being adapted to release said valve after the latter has closed said discharge opening.

In testimony that I claim the foregoing as my invention, I have hereunto set my hand in the presence of two subscribing witnesses.

SIEGMUND ROESNER.

Witnesses:
MICHAEL J. STARK,
A. G. PETERSON.